(12) United States Patent
Elmore

(10) Patent No.: US 7,392,645 B1
(45) Date of Patent: Jul. 1, 2008

(54) BED KNIFE GAGE HOLDER FOR ADJUSTING LAWN MOWER CUTTERS

(75) Inventor: Scott Elmore, Jefferson City, TN (US)

(73) Assignee: Precision Tool Products Co., Saline, MI (US)

( * ) Notice: Subject to any disclaimer, the term of this patent is extended or adjusted under 35 U.S.C. 154(b) by 19 days.

(21) Appl. No.: 11/022,420

(22) Filed: Dec. 22, 2004

Related U.S. Application Data

(60) Provisional application No. 60/532,299, filed on Dec. 23, 2003.

(51) Int. Cl.
*A01D 34/53* (2006.01)
*B23Q 17/22* (2006.01)

(52) U.S. Cl. .......................................... 56/249; 33/628

(58) Field of Classification Search .................. 56/249, 56/10.2 R; 33/628, 633–635, 640, 641, 832, 33/833, 792, 802, 836, 555, 556, 559
See application file for complete search history.

(56) References Cited

U.S. PATENT DOCUMENTS

| 2,901,831 | A | * | 9/1959 | Halvarsson | 33/501.18 |
|---|---|---|---|---|---|
| 4,205,797 | A | * | 6/1980 | Bennett et al. | 241/222 |
| 4,479,305 | A | * | 10/1984 | Wendl et al. | 33/600 |
| 5,175,939 | A | * | 1/1993 | Wolfram | 33/628 |
| 6,886,314 | B2 | * | 5/2005 | Pirro et al. | 56/10.2 R |

* cited by examiner

*Primary Examiner*—Thomas B Will
*Assistant Examiner*—Alicia Torres
(74) *Attorney, Agent, or Firm*—Barbara M. Burns

(57) ABSTRACT

An accessory to a bed knife gage and bar that holds the bar in place against the rollers on a lawn mower cutter. The accessory comprises a movable permanent magnet attached to a rod and handle, the rod, in turn, attached to the bar. Engagement of the permanent magnet with the mower cutter bed knife holds the bar and gage in place obviating the need for the user to hold the bar in place while using the gage.

8 Claims, 2 Drawing Sheets

BED KNIFE GAGE HOLDER FOR ADJUSTING LAWN MOWER CUTTERS

This application claims the benefit of provisional patent application No. 60/532,299, filed Dec. 23, 2003.

BACKGROUND OF THE INVENTION

The field of the invention pertains to lawn mowers and, in particular, to reel-type mowers principally used on golf course greens.

Golf course greens, which usually consist of carefully grown bent grass on a carefully prepared soil surface, require very accurate grass cutting to satisfy discriminating golfers, whether professionals or skilled amateurs. To obtain a smooth, even, carpet-like bent grass surface, reel mower cutters continue to be used. The reel mower cutters used, however, must be carefully and accurately sharpened and adjusted for the accurate cut required.

To obtain the proper height of the reel blades and bed knife relative to cutter rollers, a gage mounted on a bar is used. The bar rests on the two rollers, with the gage used to measure the bed knife height above the rollers. The cutting height of the cutter is thereby measured. Such a gage-and-bar device is manufactured and sold under the "ACCU-GAGE" trademark and disclosed in U.S. Pat. No. 6,073,357 which is incorporated herein by reference.

SUMMARY OF THE INVENTION

The invention comprises an accessory to the gage and bar that holds the bar in place against the cutter rollers. Adjacent the gage is a hole through the bar. In the hole is a movable permanent magnet attached to a rod. A handle or knob is attached to the opposite end of the rod. The rod is attached to a mounting plate, and a compression spring is located on the rod between the handle and the mounting plate to urge retraction of the magnet. With the bar positioned on the cutter, the magnet is pushed against the bed knife to retain the bar and gage in position without the need to manually hold the bar and gage in position.

DESCRIPTION OF THE PREFERRED EMBODIMENT

Figure 1:
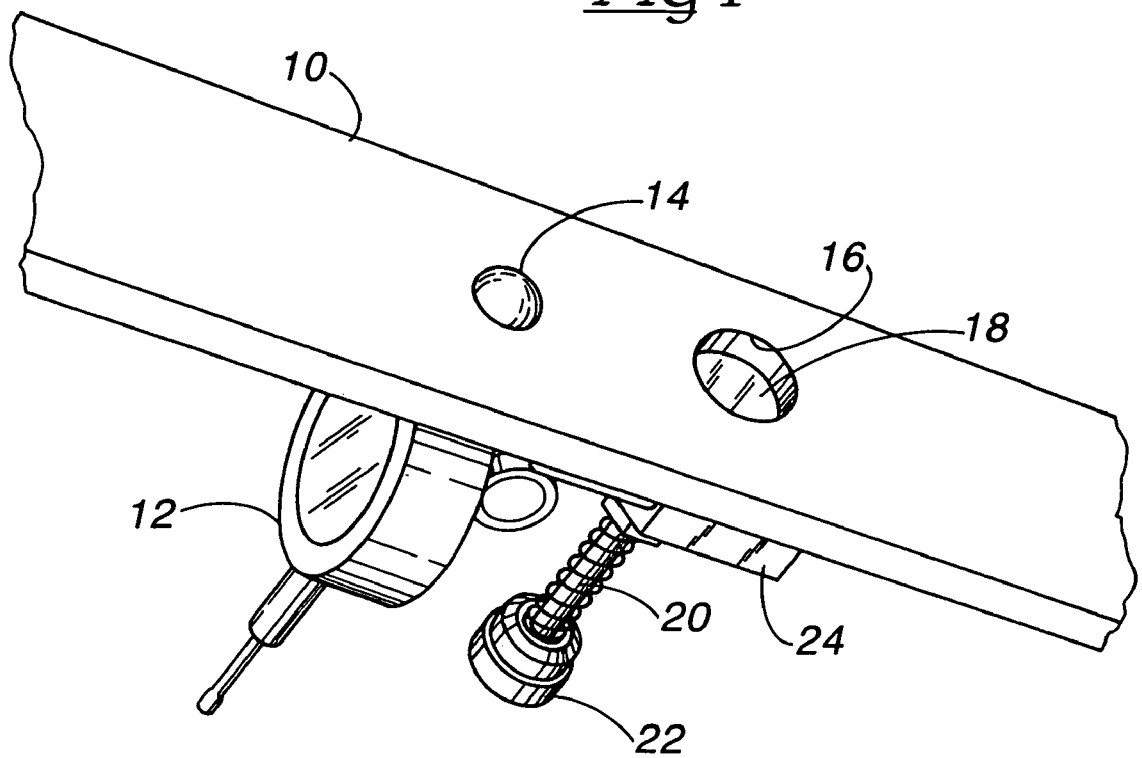
FIG. 1 is a perspective view of a gage and bar, including the new magnetic holder.

Shown in FIG. 1 is a gage bar 10 and gage 12. The gage 12 includes a movable tip 14 which extends to accurately measure the edge of a bed knife from the bar 10 in a well known manner. Adjacent the gage 12 is a hole 16 through the bar 10. Movably positioned in the hole 16 is a magnet 18.

Figure 2:
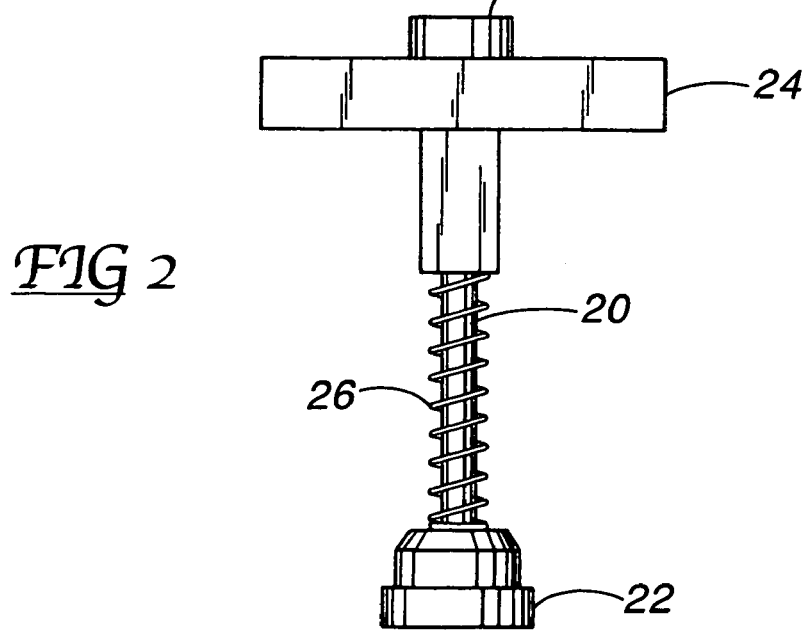
FIG. 2 is a side elevation of the magnetic holder.

The magnet 18 is affixed to the tip of a rod 20, as shown in FIG. 2. The rod 20 includes a handle or knob 22 at the other end and passes through a hole in a mounting plate 24. A compression spring 26 between the mounting plate 24 and knob 22 retracts the magnet 18 into the hole 16. The mounting plate 24 may be mechanically fastened or adhesively fastened to the bar 10.

Figure 3:
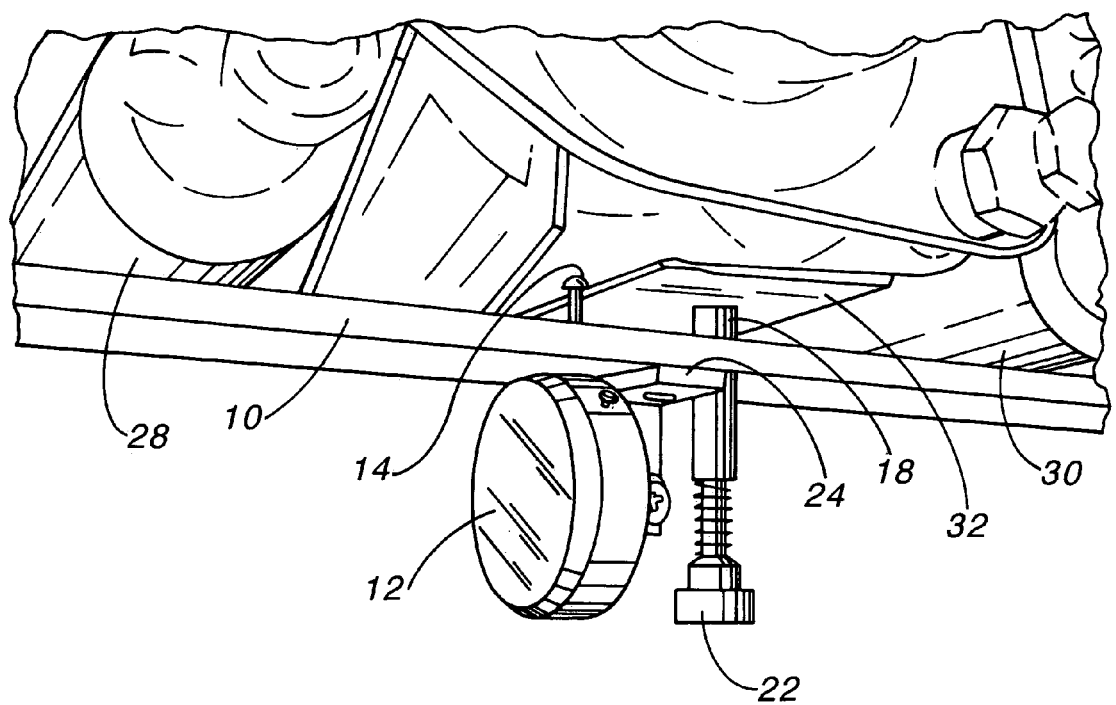
FIG. 3 is a partial perspective environmental view of the new magnetic holder.

As shown in FIG. 3, when the bar 10 and gage 12 are positioned on the front cutter roller 28 and the back cutter roller 30, with the movable tip 14 located adjacent the edge of the bed knife 32, the knob 22 is depressed, bringing the magnet 18 into attachment with the bed knife 32. The gage tip 14 can then be extended into contact with the bed knife 32 and a measurement of depth of cut made directly at the bed knife.

The invention claimed is:

1. In the combination of a bed knife gage and bar for checking the elevation of a bed knife relative to a mower cutter roller,
    the improvement comprising:
    a magnet and means movably connecting the magnet to the bar, whereby upon placement of the bar against the roller, movement of the magnet into contact with the bed knife retains the bar against the roller, and
    wherein the movable connecting means include a rod connected to the magnet and a knob on the rod, a mounting plate on the bar, the rod movably engaging the mounting plate.

2. The combination of claim 1, including a compression spring on the rod and adapted to urge the magnet away from the bed knife.

3. In the combination of a bed knife gage and bar for checking the elevation of a bed knife relative to mower cutter rollers,
    the improvement comprising:
    a through-hole in the bar and adjacent the gage, a magnet located in the through-hole and extendable therefrom, a rod connected to the magnet and a knob on the rod,
    means mounting the rod on the bar and means for urging the rod and magnet away from the bed knife.

4. The combination of claim 3 wherein the means mounting the rod on the bar include a mounting plate affixable to the bar.

5. The combination of claim 3 wherein the means for urging the rod and magnet away from the bed knife comprise a spring.

6. The combination of claim 3 wherein the means mounting the rod on the bar include a mounting plate and the means for urging the rod and magnet away from the bed knife comprise a compression spring on the rod and located between the mounting plate and the knob.

7. In the combination of a bed knife gage and bar for checking the elevation of a bed knife relative to at least one mower cutter roller,
    the improvement comprising:
    a magnet and means movably connecting the magnet to the bar; whereby upon placement of the bar against at least one mower cutter roller, movement of the magnet into contact with the bed knife retains the bar against at least one cutter roller, and
    wherein the movable connecting means include means urging the magnet away from the bed knife, and wherein the gage measures directly from the bed knife.

8. In the combination of a bed knife gage and bar for checking the elevation of a bed knife relative to at least one mower cutter roller,
    the improvement comprising:
    a magnet and means movably connecting the magnet to the bar, whereby upon placement of the bar against at least one cutter roller, movement of the magnet into contact with the bed knife retains the bar against the roller, and
    wherein the bar includes a through-hole adjacent the gage, the magnet being located in the through hole and movably extendable therefrom, and wherein the gage touches and measures directly from the bed knife.

* * * * *